(12) United States Patent
Kawai

(10) Patent No.: US 9,954,383 B2
(45) Date of Patent: Apr. 24, 2018

(54) POWER SUPPLY CONTROL DEVICE AND POWER SUPPLY CONTROL METHOD

(71) Applicant: TOYOTA JIDOSHA KABUSHIKI KAISHA, Toyota-shi, Aichi-ken (JP)

(72) Inventor: Hirohito Kawai, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 117 days.

(21) Appl. No.: 15/101,942

(22) PCT Filed: Dec. 3, 2014

(86) PCT No.: PCT/JP2014/006047
§ 371 (c)(1),
(2) Date: Jun. 6, 2016

(87) PCT Pub. No.: WO2015/097996
PCT Pub. Date: Jul. 2, 2015

(65) Prior Publication Data
US 2016/0315492 A1   Oct. 27, 2016

(30) Foreign Application Priority Data
Dec. 26, 2013   (JP) ................ 2013-268175

(51) Int. Cl.
*H02J 7/00*   (2006.01)
*H02J 1/06*   (2006.01)
*H02J 7/34*   (2006.01)
*H02J 9/00*   (2006.01)

(52) U.S. Cl.
CPC .............. *H02J 7/0068* (2013.01); *H02J 1/06* (2013.01); *H02J 7/007* (2013.01); *H02J 7/34* (2013.01); *H02J 9/00* (2013.01)

(58) Field of Classification Search
CPC ........ H02J 1/06; H02J 7/34; H02J 9/00; H02J 7/0068; H02J 7/007
See application file for complete search history.

(56) References Cited

U.S. PATENT DOCUMENTS

2006/0068239 A1   3/2006 Norimatsu et al.
2011/0260544 A1*  10/2011 Imai ................... H02J 7/1423
                                                    307/66
2013/0154574 A1*   6/2013 Nomoto ............... H01M 10/48
                                                    320/148

(Continued)

FOREIGN PATENT DOCUMENTS

JP   2006-128088 A   5/2006
JP   2011-234479 A   11/2011
JP   WO 2012/146963 A2 * 11/2012

*Primary Examiner* — Jared Fureman
*Assistant Examiner* — Duc M Pham
(74) *Attorney, Agent, or Firm* — Sughrue Mion, PLLC

(57) ABSTRACT

A main battery and a sub-battery serving as an auxiliary power source are provided to supply electric power to auxiliary machinery groups H1 to H3. In the state of normal power supply by the main battery, when the main battery is not degraded (step S102: NO), a lower limit value of SOC of the sub-battery is set equal to 0% (step S108). When the main battery is degraded (step S102: YES), on the other hand, the lower limit value of SOC of the sub-battery is set equal to a predetermined maximum value (step S112).

7 Claims, 3 Drawing Sheets

(56) References Cited

U.S. PATENT DOCUMENTS

2014/0015534 A1* 1/2014 Katayama ............ H02J 7/0077
          324/430
2015/0180257 A1* 6/2015 Snyder ................ H01M 10/441
          320/103

* cited by examiner

POWER SUPPLY CONTROL DEVICE AND POWER SUPPLY CONTROL METHOD

CROSS REFERENCE TO RELATED APPLICATIONS

This application is a National Stage of International Application No. PCT/JP2014/006047 filed Dec. 3, 2014, claiming priority based on Japanese Patent Application No. 2013-268175 filed Dec. 26, 2013, the contents of all of which are incorporated herein by reference in their entirety.

TECHNICAL FIELD

The present invention relates to control of power supply.

BACKGROUND ART

A known technique of providing an auxiliary power source in addition to a main power source aims to avoid overcharging and overdischarging of the auxiliary power source, while satisfying both suppression of degradation of a lead acid battery as the main power source and cost reduction (for example, Patent Literature 1).

CITATION LIST

Patent Literature

[PTL 1]
JP 2011-234479A.

SUMMARY

Technical Problem

The above prior art technique, however, still has room for improvement in use of the auxiliary power source.

Solution to Problem

The invention may be implemented by any of the following aspects, in order to solve the above problem.

(1) According to one aspect of the invention, there is provided a power supply control device. This power supply control device comprises: a first power source configured to supply electric power to a load; a second power source configured to supply electric power to the load in a state of a failure in normal power supply by the first power source; and a setter configured to, in a state of normal power supply by the first power source, set a lower limit value of SOC of the second power source equal to a first value when the first power source has a degree of degradation that is equal to a first degree, while setting the lower limit value of SOC equal to a second value that is greater than the first value when the degree of degradation of the first power source is equal to a second degree indicating a higher degree of degradation than the first degree. This aspect allows for the more effective use of the second power source. When the first power source is not significantly degraded (when the degree of degradation is equal to the first degree), it is unlikely to have a failure in normal power supply by the first power source. The low SOC of the second power source is thus likely to cause any significant problem. In this state, decreasing the lower limit value of SOC (hereinafter also called "lower limit SOC) of the second power source generally does not cause any significant problem. Decreasing the lower limit SOC increases the flexibility of charging and discharging of the second power source and thus achieves the above advantageous effect.

(2) In the above aspect, the setter may set the lower limit value of SOC in response to an external instruction, when the degree of degradation of the first power source is equal to the first degree. This aspect enables the lower limit SOC to be set in response to the external instruction.

(3) In the above aspect, the external instruction may include setting the lower limit value of SOC equal to the second value. This aspect enables the lower limit SOC to be set equal to the second value in response to the external instruction.

(4) In the above aspect, the second power source may have a lower internal, resistance than the first power source. This aspect allows for efficient charging into the second power source.

The invention may be implemented by any of various aspects other than those described, above, for example, a power supply control method, a program for implementing this control method and a non-transitory storage medium in which this program is stored.

DESCRIPTION OF EMBODIMENTS

Figure 1:
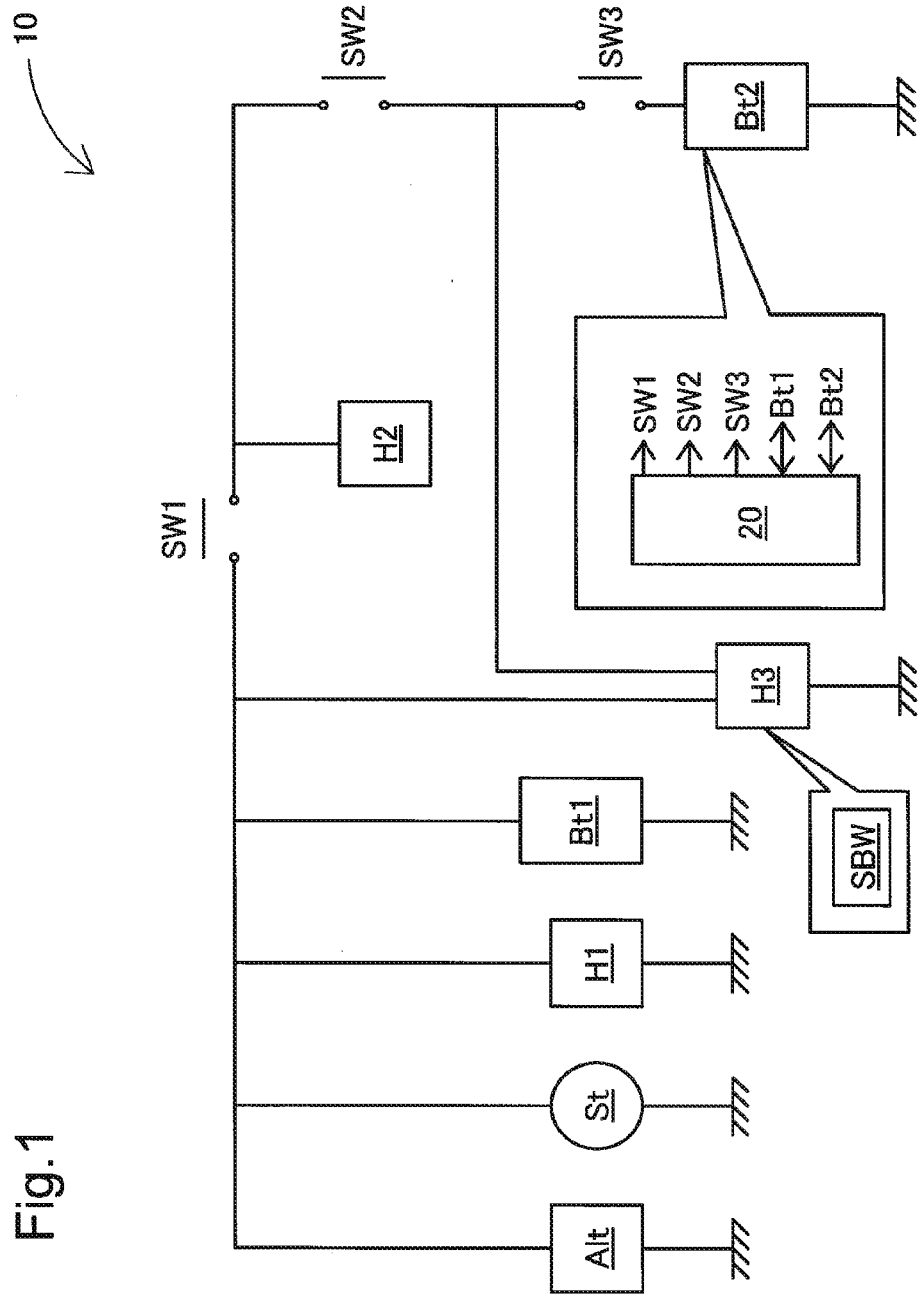
FIG. 1 is a configuration diagram of a power supply control device.

FIG. 1 illustrates the configuration of a power supply control device 10. The power supply control device 10 is mounted on an automobile. The automobile of this embodiment is a gasoline vehicle with a gasoline engine as the power source and is configured to perform idle reduction and charging by regenerative braking. The idle reduction stops the engine when the vehicle stops, while restarting the engine before the vehicle starts.

The power supply control device 10 includes auxiliary machinery groups H1 to H3, a main buttery Bt1, a sub-buttery Bt2, an alternator Alt, a starter St, and switches SW1 to SW3 implemented by relays on an electric circuit.

The auxiliary machinery group 111 includes loads such as actuators for driving and an air conditioner. The actuators for driving include an actuator for steering and an actuator for suspension.

The auxiliary machinery group H2 includes loads more needed to reduce a fluctuation in voltage of power supply than the auxiliary machinery group H1. Examples of the auxiliary machinery group H2 include audio equipment, an automotive safety system, a vehicle navigation system and an ECU for idle reduction control.

The auxiliary machinery group 113 includes loads more needed to always receive power supply than the auxiliary machinery groups H1 and H2. Examples of the auxiliary machinery group H3 include a shift-by-wire mechanism SBW shown in FIG. 1, an electric commanding brake system (ECB) and a vehicle wireless communication system.

The alternator Alt is operated to generate electric power by the torque generated by the engine or by regenerative braking. The electric power generated by the alternator Alt is charged into the main buttery Bt1 and the sub-battery Bt2.

The starter St is provided as a motor for starting the engine. The starter St receives the power supply to be rotated and apply a torque to the engine. The switches SW1 to SW3 are operated to switch over the power source used to supply electric power to the respective auxiliary machinery groups.

The main battery Bt1 is a lead acid battery. The sub-battery Bt2 is a lithium ion secondary battery. Charging by regenerative braking is mainly performed for the sub-battery Bt2. This is because the lithium ion secondary battery has a lower internal resistance and better charge acceptability than the lead acid battery.

The main battery Bt1 and the sub-battery Bt2 are configured to supply electric power to, for example, the auxiliary machinery groups H1 to H3, the alternator Alt and the starter St. The power supply to the auxiliary machinery groups H1 to H3 are mainly performed by the main battery Bt1. The sub-battery Bt2 serves as an auxiliary power source provided to supply electric power in the case of a failure of normal power supply by the main battery Bt1. The power supply to the auxiliary machinery group H2 at the time of a restart of the engine is, however, mainly performed by the sub-battery Bt2, in order to reduce a fluctuation of voltage.

The sub-battery Bt2 internally has a controller 20. The controller 20 is implemented by an IC chip. The controller 20 is configured to monitor the output voltages of the main battery Bt1 and the sub-battery Bt2 and to control the operations of the switches SW1 to SW3. The controller 20 includes a group of sensors for this purpose.

The main battery Bt1 and the sub-battery Bt2 have individually specified upper limit values and lower limit values of SOC (state of charge). In the description below, the upper limit value and the lower limit value mean the values relating to SOC. The upper limit value and the lower limit value are determined, to maximize the working range of each battery by taking into account, for example, the effect on the life of the battery. For example, the lower limit value of the sub-battery Bt2 is set to 20%, and the upper limit value to 80%. In the following disclosure of this embodiment, however, the description uses the converted, values as actual value 20% to 0% and actual value 80% to 100%. In the description below, the lower limit value of the sub-battery Bt2 is accordingly expressed as 0%.

The power supply of the sub-battery Bt2 is controlled to minimize its SOC. Such control aims to give preference to charging by regenerative braking and avoid charging by engine torque as much as possible, so as to improve the fuel consumption.

With regard to SOC of the sub-battery Bt, in order to ensure the power supply capability to the auxiliary machinery group H3, a lower limit value in the ordinary state (hereinafter referred to as "lower limit SOC") is specified separately from the lower limit value described above (hereinafter referred to as "emergency lower limit value"). In other words, SOC of the sub-battery Bt2 is controlled not to decrease below the lower limit SOC in the ordinary state of normal power supply from the main battery Bt1 to the auxiliary machinery group H3. The lower limit SOC is a variable value set by a lower limit SOC setting process described below and may take any value between the emergency lower limit value and a maximum value. The maximum value is determined in advance as a sufficient value to serve as an auxiliary power source.

In the state of a failure of normal power supply from the main battery Bt1 to the auxiliary machinery group H3, on the other hand, the lower limit SOC is neglected during power supply from the sub-battery Bt2 to the auxiliary machinery group H3. This power supply is allowed until SOC of the sub-battery Bt2 reaches the emergency lower limit value.

Figure 2:
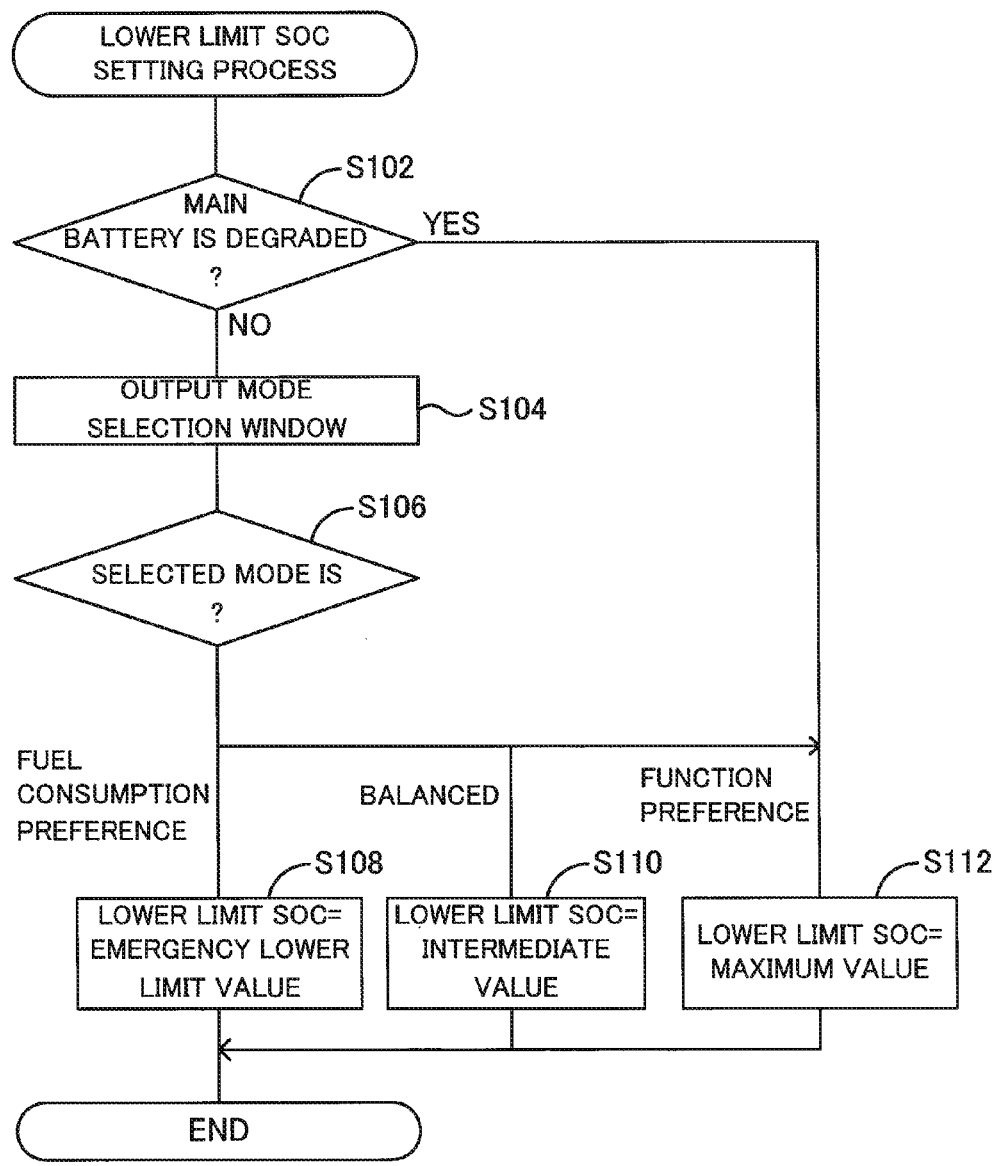
FIG. 2 is a flowchart showing a lower limit SOC setting process.

FIG. 2 is a flowchart showing a lower limit SOC setting process. This process is triggered by a start of the automobile and is performed by the controller 20 to set the lower limit SOC of the sub-battery Bt2. The start herein means a return from the state of parking and does not mean a return from the state of idle reduction.

The process first determines whether the main battery Bt1 is degraded (step S102). More specifically, the main battery B1 is determined to be degraded when the voltage of the main battery Bt1 is lower than a reference value. This reference value is determined in advance, based on the relationship between the voltage value of the main battery Bt1 and the estimated timing for replacement of the main battery Bt1.

When it is determined that the main battery Bt1 is not degraded (step S102: NO), the process displays a mode selection window (step S104). The mode selection window is provided to request the user to select any one of a fuel consumption preference mode, a balanced mode and a function preference mode. The details of these modes will be described later. This window is displayed on a liquid crystal panel mounted for the purpose of for example, vehicle navigation.

When the selected mode is the fuel consumption preference mode (step S106: Fuel Consumption Preference), the process sets the lower limit SOC equal to the emergency lower limit value (step S108). When the selected mode is the balanced mode (step S106: Balanced), the process sets the lower limit SOC equal to a value between the emergency lower limit value and the maximum value (step S110). The detailed procedure of determining this value will be described later. When the selected mode is the function preference mode (step S106: Function Preference), the process sets the lower limit SOC equal to the maximum value (step S112).

When it is determined that the main battery Bt1 is degraded (step S102: YES), on the other hand, the process sets the lower limit SOC equal to the maximum value (step S112) without requesting the user to select the mode. After setting the lower limit SOC at any of the steps described above, the lower limit SOC setting process is terminated.

The fuel consumption preference mode mentioned above is provided as a mode to give preference to charging by regenerative braking, in order to improve the fuel consumption. Accordingly, the lower limit SOC is set equal to a smallest possible value, i.e., emergency lower limit value as described above. SOC of the sub-battery Bt2 is likely to decrease in the state that the lower limit SOC is set equal to the emergency lower limit value, compared with in the state that the lower limit SOC is set equal to the maximum value. The decreasing SOC improves the fuel consumption as described above.

When the main battery Bt1 is degraded, it is likely to have a failure in normal power supply by the main battery Bt1. The sub-battery Bt2 is provided as the auxiliary power source functioning in such a case as described above. In order to serve as the auxiliary power source, the sub-battery Bt2 preferably has SOC equal to or higher than a predetermined value. More specifically, when the main battery Bt1 is degraded, it is preferable to set the lower limit SOC equal to the maximum value. When preference is given to the function as the auxiliary power source over the improvement of fuel consumption (step S106: Function Preference), the lower limit SOC is set equal to the maximum value.

The balanced mode mentioned above is an intermediate mode between the fuel consumption preference mode and the function preference mode. Accordingly, the lower limit SOC is set equal to a value that is greater than the emergency lower limit value but is smaller than the maximum value. More specifically, this value is calculated by an equation below:

$$Sb=\{(Sm-Se)*(Vi-Vn)/(Vi-Ve)\}+Se$$

wherein Sb represents a lower limit SOC set in the balanced mode, Se represents an emergency lower limit value, Sm represents a maximum value of lower limit SOC, Vi represents a voltage value of a new main battery Bt1, Vn represents a current voltage value of the main battery Bt1 and Ve represents a voltage value indicating an estimated timing for replacement of the main battery Bt1. According to this embodiment, since Se=0%, substitution of this setting into the above equation gives an equation given below:

$$Sb=Sm*(Vi-Vn)/(Vi-Ve)$$

Figure 3:
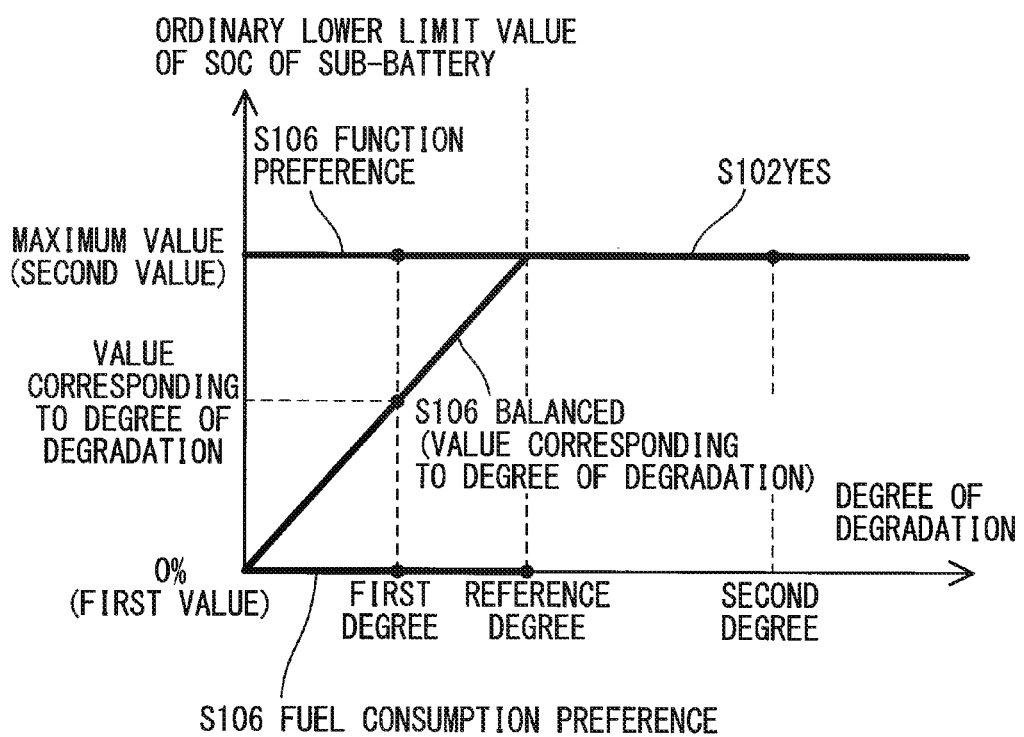
FIG. 3 is a graph showing the relationship between lower limit SOC of a sub-battery and degree of degradation of a main battery.

FIG. 3 is a graph showing the relationship between the lower limit SOC and the degree of degradation of the main battery Bt1. As shown in FIG. 3, when the degree of degradation is equal to or higher than a reference degree, the lower limit SOC is fixed to the maximum value (an example of the "second value" of the claims). The reference degree herein means a degree of degradation indicating an estimated timing for replacement of the main battery Bt1. The second degree of the claims is illustrated, for example, as a certain degree of or above the reference degree in FIG. 3.

When the degree of degradation is lower than the reference degree, on the other hand, as described above with reference to FIG. 2, the lower limit SOC may take one of three different values, based on the user's selection of the mode. In the case of selection of the fuel consumption preference mode at step S106, the lower limit SOC is set equal to 0% (an example of the "first value" of the claims). In the case of selection of the balanced mode at step S106, the lower limit SOC is set equal to a value corresponding to the degree of degradation. In the case of selection of the function preference mode at step S106, the lower limit SOC is set equal to the maximum value.

As described above, setting the second degree to be greater than the reference degree is only illustrative. In other words, the second degree may be set to a value that is higher than the first degree but is lower than the reference degree. Even in this case, the greater value is set to the lower limit SOC at the second degree than the value set at the first degree in the balanced mode, so that such setting should be construed to be in the scope of the invention.

Similarly, setting the first value equal to the emergency lower limit value (0%) is only illustrative. The first value in the balanced mode is a value equal to or greater than the emergency lower limit value but is smaller than the lower limit SOC set at the second degree. This setting should thus be construed to be in the scope of the invention.

The embodiment described above determines the lower limit SOC of the sub-battery Bt2, based on the degree of degradation. This allows for the more effective use of the sub-battery Bt2 and thereby improves the fuel consumption. Additionally, determining the lower limit SOC of the sub-battery Bt2 based on the degree of degradation of the main battery Bt1 and the user's demand achieves the good balance between the improvement of fuel consumption and the function as the auxiliary power source.

The invention is not limited to any of the embodiments, the examples and the modifications described herein but may be implemented by a diversity of other configurations without departing from the scope of the invention. For example, the technical features of the embodiments, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein. Some examples of possible modification are given below.

One modification may not employ the balanced mode and may set either the first value (for example, 0%) or the second value (for example, the maximum value) to the lower limit SOC.

Another modification may not employ the fuel consumption preference mode and may set the lower limit SOC either in the balanced mode or in the function preference mode.

When the degree of degradation is lower than the reference degree, the lower limit SOC in the balanced mode may be set automatically, irrespective of the user's instruction.

The relationship between the lower limit SOC and the degree of degradation in the balanced mode is not limited to the linear relationship, but may follow, for example, a monotonically increasing function (such as quadratic curve).

In the whole range of the degree of degradation, the lower limit SOC may be set to a value corresponding to the degree of degradation of the main battery.

The emergency lower limit value of the sub-battery may be a value greater than 0% or may be a value smaller than 0%.

At least one of the main battery and the sub-battery may be replaced by a capacitor.

The main battery is not limited to the lead acid battery, and the sub-battery is not limited to the lithium ion secondary battery. For example, a nickel hydride battery may be used instead.

The setting of the lower limit SOC may be performed at regular intervals. For example, in the case of a long driving time of the vehicle (time from a start of the vehicle to parking) (for example, in the case of a commercial vehicle), the driving time may be not sufficiently short relative to the progress of degradation of the main battery. By taking into account such a possible situation, the lower limit SOC setting process may be performed at regular intervals to change over the mode during driving. This lower limit SOC setting process may be performed irrespective of the user's instruction.

The power supply control device of the invention may be applied to another vehicle equipped with a power source (for example, hybrid vehicle, electric vehicle or fuel cell vehicle) or may be applied to any of other transportation means (for example, two-wheel vehicle or train vehicle). Additionally, the power supply control device of the invention may be applied to any device for controlling power supply other than the transportation means (for example, power generation device).

REFERENCE SIGNS LIST

10 Power supply control device
20 Controller
H1 to H3 Auxiliary machinery groups
St Starter
SW1 to SW3 Switches SBW Shift-by-wire mechanism
Bt1 Main battery
Bt2 Sub-battery
Alt Alternator

The invention claimed is:

1. A power supply control device, comprising:
a first power source configured to supply electric power to a load;
a second power source configured to supply electric power to the load in a state of a failure in normal power supply by the first power source; and
a setter configured to, in a state of normal power supply by the first power source, set a lower limit value of SOC of the second power source equal to a first value when the first power source has a degree of degradation that is equal to a first degree, while setting the lower limit value of SOC equal to a second value that is greater than the first value when the degree of degradation of the first power source is equal to a second degree indicating a higher degree of degradation than the first degree.

2. The power supply control device according to claim 1, wherein the setter sets the lower limit value of SOC in response to an external instruction, when the degree of degradation of the first power source is equal to the first degree.

3. The power supply control device according to claim 2, wherein the external instruction includes setting the lower limit value of SOC equal to the second value.

4. The power supply control device according to claim 3, wherein the second power source has a lower internal resistance than the first power source.

5. The power supply control device according to claim 2, wherein the second power source has a lower internal resistance than the first power source.

6. The power supply control device according to claim 1, wherein the second power source has a lower internal resistance than the first power source.

7. A power supply control method, comprising:
in a state of a failure in normal power supply by a first power source to a load, activating a second power source to supply electric power to the load; and
in a state of normal power supply by the first power source, setting a lower limit value of SOC of the second power source equal to a first value when the first power source has a degree of degradation that is equal to a first degree, while setting the lower limit value of SOC equal to a second value that is greater than the first value when the degree of degradation of the first power source is equal to a second degree indicating a higher degree of degradation than the first degree.

* * * * *